Oct. 29, 1946.  J. FRESCO  2,410,056
VARIABLE CAMBER WING
Filed Jan. 11, 1945  2 Sheets-Sheet 1
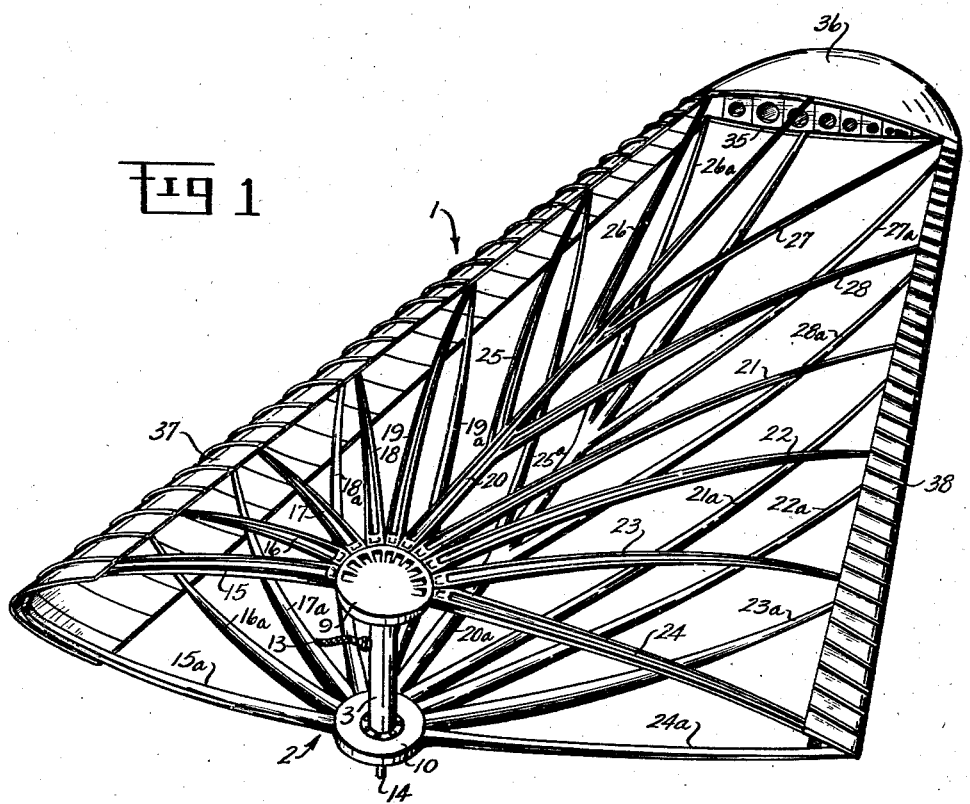
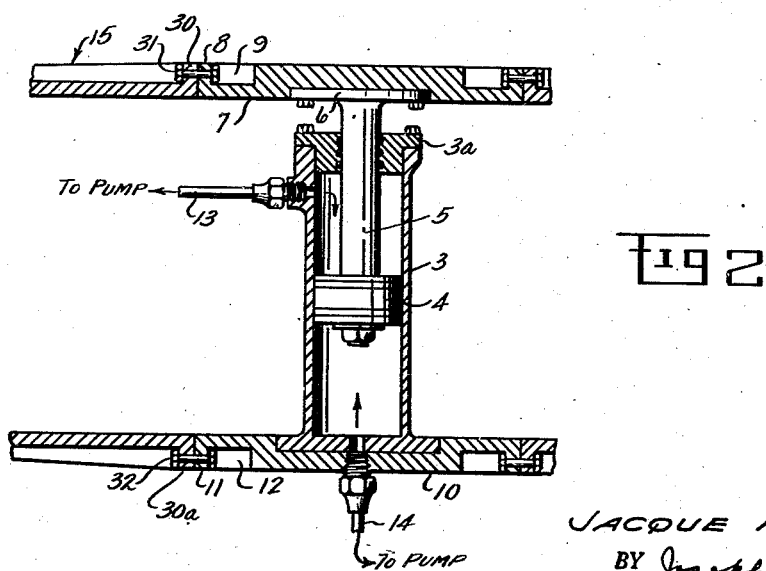
INVENTOR.
JACQUE FRESCO
BY
ATTORNEYS Oct. 29, 1946. J. FRESCO 2,410,056
VARIABLE CAMBER WING
Filed Jan. 11, 1945 2 Sheets-Sheet 2
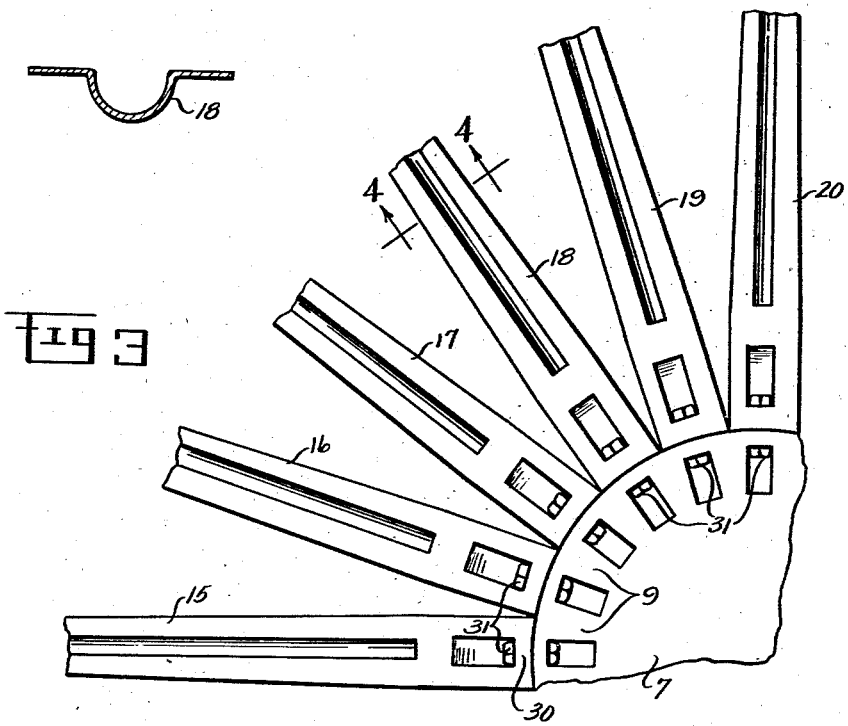
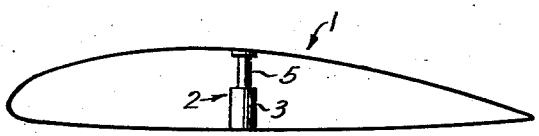
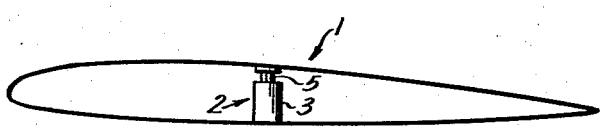
INVENTOR.
JACQUE FRESCO Patented Oct. 29, 1946

2,410,056

UNITED STATES PATENT OFFICE 2,410,056

VARIABLE CAMBER WING

Jacque Fresco, Hollywood, Calif.

Application January 11, 1945, Serial No. 572,290

9 Claims. (Cl. 244—44)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to aircraft wing construction wherein the structural framework comprises spar members arranged to transmit loads from the various local wing area portions to the wing supports in a more efficient manner than in conventional constructions.

Photoelastic studies of aircraft wing models, by the present inventor, have demonstrated that the stresses and strains produced by loading the models tend to travel from various portions of the wing in substantially straight lines to the point of maximum camber of the root chord, and torsional loads tend to produce a somewhat similar phenomenon.

The results of these tests indicated that if structural members were arranged to transmit wing loads from various zones in as nearly a straight line as possible to the point of maximum camber at the root chord, a wing structure having a maximum strength with minimum weight would be attained.

In accordance with the invention, the desirable load transmission pointed out above is attained by constructing a wing with a hub structure positioned at the point of maximum camber of the root chord in the plane of symmetry and having a plurality of spar members lying in the plane of the upper and lower boundary surfaces of the wing and angularly disposed with respect to each other, the spars being connected to the hub member for transmitting load thereto. By making the spars flexible over at least a portion of their length and connecting the same at their outer ends to flexible leading and trailing edges and by arranging the hub member in two relatively movable parts, it is possible to vary both the airfoil section thickness ratio as well as the wing area.

It is the principal object of the invention to provide an airplane wing having a spar structure arranged to transmit the loads from the various portions of the wing to the wing attachment points in an efficient manner.

It is a further object of the invention to provide a wing structure for airplanes in which the spar members are disposed so as to define the upper and lower boundary surfaces of the wing, the spar members being flexible over at least a portion of their length, and the spars being connected at their outer ends in related pairs and at their inner ends to relatively moveable hub members, which, upon relative displacement, causes a simultaneous variation in airfoil thickness ratio and wing area.

Other objects and features of the invention will become apparent by reference to the detailed description hereinafter given and to the appended drawings in which:

Fig. 1 is an isometric view illustrating the construction of one-half of a wing in accordance with the invention;

Fig. 2 is a side elevation illustrating in a larger scale the construction of the hydraulic camber bearing mechanism associated with the hub structure of Fig. 1;

Fig. 3 is a top plan view illustrating the connection of the spars to the hub structure;

Fig. 4 is a section taken on line 4—4 of Fig. 3 illustrating a typical cross section of the flexible portion of a spar;

Fig. 5 is a diagrammatic sectional view showing the wing adjusted for maximum thickness to chord ratio to develop high lift; and Fig. 6 is a view similar to Fig. 5 showing the wing adjusted for minimum thickness to chord ratio so as to be suitable to the high speed flight condition.

Referring now to Fig. 1, the reference numeral 1 generally indicates a right-hand wing panel of an aircraft wing constructed in accordance with the invention, the wing being symmetrical about a longitudinal plane containing the root chord and the left-hand portion of the wing (not shown) being identical to the construction illustrated in Fig. 1. As seen in the figure, the wing includes a hub structure, generally indicated by the reference numeral 2 and shown in more detail in Fig. 2 as comprising a hydraulic cylinder 3 having a piston 4 axially movable therein, to which is secured a piston rod 5 having an enlarged head portion 6 at the upper end thereof and which is secured by bolts or the like to a braced disk or hub member 7 provided with a spar-attaching flange portion 8 and radially extending brace webs 9. The cylinder 3 at its lower portion is preferably integrally formed with a hub or disk member 10, similar in construction to the hub member 7, and also provided with an annular spar attaching flange 11 and braced by radially extending webs 12. The cylinder 3 is provided at its upper end with a conventional cylinder head and packing gland structure 3a which permits reciprocable movement of the piston rod 5 therein, and conduits 13 and 14 serve to admit fluid pressure respectively to opposite sides of the piston 4 to move the piston relative to the cylinder 3. The source of fluid pressure to the conduits 13 and 14 may be, for example, a hand operated pump and valve mechanism (not shown) whereby fluid may be pumped into the cylinder 3 on either side of the piston 4 and trapped therein so that the hub member 7 may be shifted any desirable amount relative to hub member 10 to vary the wing airfoil section thickness ratio as well as the area of the wing in a manner which will now be described.

Referring again to Fig. 1, it is seen that the hub member 7 has connected therewith a plurality of angularly disposed spar members, respectively, indicated by reference numerals 15 to 24, inclusive, and the spar member 20 being disposed in the plane of the maximum thickness of the airfoil sections of the wing and being subdivided or branched into further spar members 25 to 28, inclusive. The hub structure 2 is positioned in the plane of symmetry and at the point of maximum thickness of the root chord of the wing, and the spars 15 to 24, inclusive, are formed at their inner ends as U-shaped channel members each terminating in an end wall 30 secured by means of bolts 31 or the like (see Figs. 2 and 3) to the flange 8 of the hub member 7. The spar members, while rigid adjacent their points of connection to the hub member 7, have a section such as indicated in Fig. 4, outwardly thereof to provide a considerable degree of resilience.

As will be noted in Fig. 1, the spar members 15 to 28, inclusive, define the upper boundary surface of the wing structure, and similarly companion spars are positioned in the lower boundary surface of the wing and indicated by the same reference numerals with the subscript "a" appended thereto. The spar members lying in the under boundary surface of the wing cooperate with corresponding spar members in the upper surface to form related pairs of spars which are integrally or otherwise connected at their outer ends and the spars 15a to 24a, inclusive, are all secured at their inner ends by means of bolts 32 which pass through the end walls 30a and the flange 11 of the lower hub member 10 (see Fig. 2). The lower spar member 20a is branched into branches 25a to 28a in the same manner as the upper spar member 20, the branched spar members also forming related pairs. It will be seen, by reference to Fig. 1, that the spar members lying in the upper and lower boundary surfaces of the wing and extending angularly from the hub members 7 and 10 define a wing structure without the use of conventional rib members, with the exception that the terminal portions of spars 20 and 20a and branch spar members 26 to 27 and 25a to 28a have their terminal portions rigidly interconnected by means of a transverse rib member 35 which also serves as an anchorage or support for a conventional rotatable tip aileron 36. A flexible leading edge 37 tapered in thickness is secured to those pairs of spar members whose terminal ends extend to the forward marginal boundary of the wings, the leading edge being preferably secured so as to allow the nose portion to expand and contract. In a similar manner a tapered trailing edge portion of flexible material 38 is secured to the terminal portions of those related pairs of spars which extend to the rear marginal boundary of the wing.

It will be readily understood by reference to Fig. 1 that the spars in the upper and lower boundary surfaces of the wing, being flexible over at least their outer portions, will permit the upper and lower boundaries of the wing to be moved relative to each other by movement of the piston 4, Fig. 2, in the cylinder 3. As the piston 4 moves upward the maximum thickness of any transverse airfoil section through the wing will be increased and simultaneously the chord of such a section will be decreased so that the ratio of thickness to chord will be increased, (see also Fig. 5) and conversely a downward movement of the piston 4 within the cylinder 3, Fig. 2, will cause a decrease in thickness ratio and an increase in the wing chord at any transverse section (see also Fig. 6) so that the wing area as well as the thickness ratio will be simultaneously varied. It will be noted that substantially all areas in the boundary length of any spar between the leading and trailing edges will remain constant and variations in length will occur mainly at the connection of the related pairs of spars at the leading and trailing edges. Accordingly, the wing may be covered between the leading and trailing edges with thin sheet metal, doped fabric or suitable plastic material secured to the spar members by rivets, wire stitching, or the like. It is essential that the leading and trailing edges 37 and 38 be made of flexible material and suitably locally stiffened by corrugations, or the like, to resist shear failure.

*Operation*

It will be readily understood by reference to Figure 1 that movement of the hub members 7 and 10 relative to each other caused by fluid pressure acting on piston 4 will cause the spar members to yield resulting in an increase or decrease in airfoil section thickness in a manner previously described. Since, by increasing the thickness ratio of an airfoil section its lift coefficient may be increased in nearly direct proportion to the increase in thickness, it is possible to create a high lift for takeoff and landing with an aircraft constructed in accordance with the invention merely by the pilot admitting fluid under pressure to conduit 14, Fig. 2, to move the piston 4 upward, and once the aircraft is in the air fluid may be drained by the cylinder 3 from the underside of the piston 4 and fluid admitted under pressure through conduit 13 to the upper side of piston 4 so that the wing thickness ratio will be decreased, causing a decrease in lift coefficient as well as drag coefficient to obtain the most favorable airfoil characteristics for high speed flight. It will be readily understood that by trapping fluid in the cylinder 3, the piston 4 may be effectively locked at any point in its permissible range of movement so that the variation in thickness ratio and corresponding change in area of the wing is under control of the pilot at all times, and aerodynamic forces acting on the wing can not have any detrimental action. It is to be understood that the invention contemplates any suitable means to perform the equivalent function of the hydraulic jack structure including cylinder 3 and piston 4, illustrated in Figs. 1 and 2, such as, for example, a mechanical screw jack manually or power actuated which would readily serve the same function.

It will be readily seen that the spar arrangement in the wing of Fig. 1 is such that the air loads transmitted to the spars from the wing covering, not shown, will in each instance be transmitted along the spars to the point of maximum camber at the root chord so that the structure in accordance with the invention gives rise to the desirable stress transmission previously described. It should also be understood that while the wing structure of Fig. 1 is illustrated as being of variable camber, variable area type, that these latter named functions may be dispensed with and the spars arranged as a rigid framework. In such a case, the spars may have their upper and lower edges defining the upper and lower boundary surfaces of the wing. It will be obvious with such an arrangement that a conventional type aileron may be employed in lieu of the tip aileron such as illustrated in Fig. 1.

While one form of the invention has been illustrated and described, other modifications and variations thereof will become apparent to those skilled in the art as falling within the scope of the invention as defined in the appended claims.

I claim:

1. An airplane wing construction of double surface airfoil cross section comprising a central hub structure positioned in the plane and substantially at the point of maximum camber of the root chord, a plurality of sets of angularly disposed spars connected to said hub member and extending radially, one set lying in the upper boundary surface of the wing and the other set lying in the lower boundary surface of the wing, and means connecting the terminal end of each spar in one set to the terminal end of a respective spar in the other set to form related pairs and also connecting said pairs to each other, the terminal ends of said pairs of spars lying in the marginal boundaries of the wing between the tip and root chord sections.

2. The structure as claimed in claim 1, in which at least certain of the spars of each set are subdivided into branched spar elements angularly disposed with respect to each other.

3. The structure as claimed in claim 1, in which each of said spars is flexible throughout at least the outer portion of its length, a flexible leading edge connected to the terminal portions of certain of said related pairs of spars and a flexible trailing edge connected to the terminal portions of other of said related pairs of spars, said hub structure including two relatively movable parts to which said sets of spars are respectively connected and means for moving said hub parts to simultaneously vary the thickness ratio of the airfoil sections of the wing and the projected area of the wing.

4. A variable camber variable area airplane tapered wing construction of double surface airfoil cross section comprising a plurality of flexible spar members angularly disposed with respect to each other and respectively lying in the upper and lower boundary surfaces of the wing structure, spaced upper and lower hub members, connections between said spars and a respective hub member, the terminal ends of said spars extending to the marginal edges of the wing structure and upper and lower spars being connected at their terminal ends to form related pairs, flexible leading and trailing edges connecting the terminal portions of certain of said pairs of spars and means for moving said hub members relative to each other to thereby vary the thickness ratio and chord length of the airfoil cross sections of the wing.

5. The structure as claimed in claim 4, in which certain of said spar members are subdivided into branches angularly disposed with respect to each other.

6. The structure as claimed in claim 4, in which one of said related pairs of spars extends from the root chord in the plane of maximum camber of the airfoil sections and each spar of said pair being subdivided into branches extending to the leading and trailing edges respectively.

7. The structure as claimed in claim 4, in which the means for moving said hub members relative to each other comprises a fluid pressure actuated jack.

8. In a tapered double-surfaced airplane wing construction, a central anchorage means positioned at the point of maximum camber of the root chord, radially extending spar members secured at one end thereof to said anchorage means and angularly disposed with respect to each other and defining the upper and lower boundary surfaces of the wing, a leading edge secured to the free ends of certain of said spars and a trailing edge secured to other of said spar members.

9. The structure as claimed in claim 8, in which one of said spar members extends from said anchorage means to the wing tip in the plane of maximum camber of the airfoil cross sections of the wing, and angularly disposed branch spar members secured to said last-named spar member.

JACQUE FRESCO.